US009593400B2

(12) United States Patent
Jansen et al.

(10) Patent No.: US 9,593,400 B2
(45) Date of Patent: *Mar. 14, 2017

(54) STEEL STRIP HAVING A LOW SI CONTENT

(71) Applicant: TATA STEEL IJMUIDEN BV, Ijmuiden (NL)

(72) Inventors: Egbert Jansen, Purmerend (NL); Edward Anton Frederik Span, Nieuw-Vennep (NL); Richard Mostert, Heemskerk (NL); Theo Arnold Kop, Haarlem (NL)

(73) Assignee: TATA STEEL IJMUIDEN BV, Ijmuiden (NL)

(*) Notice: Subject to any disclaimer, the term of this patent is extended or adjusted under 35 U.S.C. 154(b) by 48 days.

This patent is subject to a terminal disclaimer.

(21) Appl. No.: 14/389,620

(22) PCT Filed: Apr. 5, 2013

(86) PCT No.: PCT/EP2013/001017
§ 371 (c)(1),
(2) Date: Sep. 30, 2014

(87) PCT Pub. No.: WO2013/149734
PCT Pub. Date: Oct. 10, 2013

(65) Prior Publication Data
US 2015/0071811 A1    Mar. 12, 2015

(30) Foreign Application Priority Data
Apr. 5, 2012  (EP) .................. 12002492

(51) Int. Cl.
| *C22C 38/58* | (2006.01) |
| *C23C 2/06* | (2006.01) |
| *C22C 38/00* | (2006.01) |
| *C22C 38/02* | (2006.01) |
| *C22C 38/06* | (2006.01) |
| *C22C 38/28* | (2006.01) |
| *C22C 38/38* | (2006.01) |
| *B32B 15/01* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C21D 8/02* | (2006.01) |
| *C22C 38/22* | (2006.01) |
| *C22C 38/24* | (2006.01) |
| *C22C 38/26* | (2006.01) |
| *C22C 38/32* | (2006.01) |

(52) U.S. Cl.
CPC ............ *C22C 38/58* (2013.01); *B32B 15/013* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/004* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C23C 2/06* (2013.01); *C21D 2211/005* (2013.01); *C21D 2211/008* (2013.01); *Y10T 428/12799* (2015.01)

(58) Field of Classification Search
CPC ....................................... C22C 38/58
USPC ................. 148/330, 333–335; 420/103, 112
See application file for complete search history.

(56) References Cited

U.S. PATENT DOCUMENTS

| 2003/0047256 A1 | 3/2003 | Kami et al. |
| 2003/0111144 A1 | 6/2003 | Matsuoka et al. |
| 2009/0022619 A1 | 1/2009 | Hamada et al. |
| 2010/0139816 A1 | 6/2010 | Hanlon et al. |
| 2010/0330392 A1 | 12/2010 | Ono et al. |
| 2012/0118439 A1 | 5/2012 | Ono et al. |
| 2012/0282487 A1 | 11/2012 | Ogawa et al. |

FOREIGN PATENT DOCUMENTS

| EP | 1193322 A1 | 4/2002 |
| EP | 1195447 A1 | 4/2002 |
| EP | 1995339 A1 | 11/2008 |
| EP | 2169091 A1 | 3/2010 |
| EP | 2434027 A1 | 3/2012 |
| EP | 2447390 A1 | 5/2012 |

(Continued)

OTHER PUBLICATIONS

International Search Report dated May 3, 2013 from International Application PCT/EP2013/001017 to Tata Steel Ijmuiden BV filed Apr. 5, 2013.

(Continued)

*Primary Examiner* — Brian Walck
(74) *Attorney, Agent, or Firm* — Vorys, Sater, Seymour and Pease LLP

(57) ABSTRACT

A dual phase or complex phase steel strip showing no tigerstripes. The steel strip includes, in mass percent, the following elements: C 0.08-0.11%; Mn 1.70-2.20%; Si at most 0.1%; Cr 0.40-0.70%; Mo at most 0.3%; Ni at most 1.0%, Al 0.01-1.50%; Nb at most 0.07%; P equal to or more than 0.005%; N equal to or less than 0.015%; Ti equal to or less than 0.1%; V equal to or less than 0.1%; B equal to or less than 0.01%; wherein the sum of Cr, Mo and Ni is at least 0.5%; the balance being Fe and inevitable impurities.

21 Claims, No Drawings

(56) References Cited

FOREIGN PATENT DOCUMENTS

| | | |
|---|---|---|
| WO | 2008102009 A1 | 8/2008 |
| WO | 2011055844 A1 | 5/2011 |
| WO | 2013149732 A1 | 10/2013 |

OTHER PUBLICATIONS

Notification of Transmittal of the International Preliminary Report on Patentability dated Jul. 23, 2014 from International Application PCT/EP2013/001017 to Tata Steel Ijmuiden BV filed Apr. 5, 2013.

STEEL STRIP HAVING A LOW SI CONTENT

CROSS-REFERENCE TO RELATED APPLICATIONS

This is a §371 National Stage Application of International Application No. PCT/EP2013/001017 filed on Apr. 5, 2013, claiming the priority of European Patent Application No. 12002492.2 filed on Apr. 5, 2012.

FIELD OF THE INVENTION

The invention relates to a steel strip having a low silicon content, in particular a hot dip galvanised steel strip, more particularly a hot dip galvanised dual phase or complex phase steel strip.

BACKGROUND OF THE INVENTION

Dual phase (DP) steel strip having balanced properties regarding strength and ductility (formability) is well known in the art. In cold rolled DP steel strip silicon is a very common alloying element for reason of cost reduction and/or control, solid solution strengthening, avoiding carbide precipitation, which is favourable in view of ductility (elongation). However, Si induces surface-related problems. Si oxides formed during processing in the hot strip mill and annealing line increase the risk of the occurrence of so-called "tiger stripes", which affect appearance and coatability. Therefore, commonly the use of silicon in DP steel is restricted, especially in hot dip galvanized (HDG) DP steel. Typically Si content in DP steel is 0.2-0.3 wt. % in HDG DP sheet and 0.2-0.5 wt. % in uncoated steel sheet.

From EP 2169091 A1 a high-strength hot-dip galvanized steel sheet with low yield strength is known. The steel composition comprises, in mass percent, 0.01-0.12% C, 0.2% or less Si, less than 2% Mn, 0.04% or less P, 0.02% or less S, 0.3% or less sol. Al, 0.01% or less N, 0.3-2% Cr, also satisfying the condition 2.1≤[Mneq]≤3 and 0.24≤[% Cr]/[% Mn], the balance being iron and inevitable impurities. The steel microstructure is composed of ferrite and a second phase, wherein the area ratio of the second phase is 2-25%, the area ratio of pearlite or bainite in the second phase is 0-20%, the average grain diameter of the second phase is 0.9-7 micrometer, and the area ratio of grains with a grain diameter of less than 0.8 micrometer in the second phase is less than 15%. The steel composition is exemplified by a number of examples based on a low Si and low Al alloying philosophy.

SUMMARY OF THE INVENTION

It is an object of the present invention to provide a steel composition, such as a dual phase (DP) or complex phase (CP) steel composition, which combines desired microstructure properties regarding strength and ductility with sufficient surface quality, in particular avoiding the occurrence of tiger stripes.

It is another object of the invention to provide such a steel composition having a good coatability.

DETAILED DESCRIPTION OF THE PREFERRED EMBODIMENTS

According to the invention a steel strip having an ultimate tensile strength Rm in the 600 MPa steel category is provided which comprises, in mass percent, the following elements:

C 0.08-0.11%;
Mn 1.70-2.20%;
Si at most 0.1%;
Cr 0.40-0.70%;
Mo at most 0.3%;
Ni at most 1.0%,
Al 0.01-1.50%;
and optionally one or more elements selected from the group consisting of:
Nb at most 0.07%;
P equal to or more than 0.005%;
N equal to or less than 0.015%;
Ti equal to or less than 0.1%;
V equal to or less than 0.1%;
B equal to or less than 0.01%
wherein the sum of Cr, Mo and Ni is at least 0.5%;
the balance being Fe and inevitable impurities.

Surprisingly it has been found that the steel composition according to the invention does not show tiger stripes at an acceptable level of strength and formability properties comparable to traditional (HDG) DP steel strip at the 600 MPa level.

Regarding the metallurgical aspects the following guidelines are deemed to apply:

C is 0.08-0.11%, in view of spot weldability. If C is below 0.08%, then the carbon content is too low to create DP or CP microstructures.

Si is at most 0.1%. Si has shown to be the major factor responsible for tiger stripes. In order to avoid the risk of the occurrence of these surface defects in a secure way, the amount is limited to a maximum of 0.1%. Preferably the Si content is in the range of 0.02-0.08%.

Usually the addition of Al and Si has a similar beneficial effect on the formability of steels. However, in view of tiger stripes Al has a negligible effect. Therefore Al is in the range of 0.01-1.5%, such as 0.01-1.10%. Preferably, the minimum amount of Al is more than 0.1%, more preferably more than about 0.2%, and Al content is advantageously less than 0.5%, such as about 0.3%.

Mn is present at a level of 1.7-2.20%, preferably 1.70-1.95 thereby compensating the reduction of strength caused by the low Si content.

Cr, Mo and Ni are also present for strength and hardening reasons determining the DP or CP microstructure of the steel strip of the invention. According to the invention the total sum of these elements is at least 0.5%. The amounts of the individual elements are Cr 0.4-0.7%, preferably 0.5-0.6%;
Mo at most 0.3%, preferably less than 0.01%; and
Ni 0-1.0%, preferably 0-0.05%.

The steel strip composition may optionally comprise other alloying elements in small amounts. The sum of inevitable impurities and other alloying elements is advantageously less than 1.25%. Preferably the upper limits of the additional alloying elements and individual impurities are P equal to or more than 0.005% and advantageously at most 0.05%
N at most 0.015%
Nb at most 0.07%, preferably at most 0.005%
Ti at most 0.1%
V at most 0.1%
B at most 0.01%.

Preferably the steel strip according to the invention has a microstructure comprising martensite 2-50%, preferably at least 5%; ferrite 50-98%; and optionally pearlite less than 3%, preferably about 0%. Advantageously the grain size is about 30 micrometer or less.

In a preferred embodiment the steel strip is coated with a coating comprising Zn. Although the coating can be applied in various ways, hot dip galvanising is preferred using a standard GI coating bath. Other Zn coatings may also be applied. An example comprises a Zn alloy coating according to WO 2008102009, in particular a zinc alloy coating layer consisting of 0.3-4.0% Mg and 0.05%-6.0% Al and optionally at most 0.2% of one or more additional elements along with unavoidable impurities and the remainder being zinc. An additional element typically added in a small amount of less than 0.2 weight %, could be selected from the group comprising Pb or Sb, Ti, Ca, Mn, Sn, La, Ce, Cr, Ni, Zr or Bi. Pb, Sn, Bi and Sb are usually added to form spangles. Preferably, the total amount of additional elements in the zinc alloy is at most 0.2%. These small amounts of an additional element do not alter the properties of the coating nor the bath to any significant extent for the usual applications. Preferably, when one or more additional elements are present in the zinc alloy coating, each is present in an amount <0.02 weight %, preferably each is present in an amount <0.01 weight %. Additional elements are usually only added to prevent dross forming in the bath with molten zinc alloy for the hot dip galvanising, or to form spangles in the coating layer.

The invention will be further illustrated by means of the following examples:

Examples 1-4

Sheets having a composition as indicated in Table 1 were manufactured by a usual cold rolling and continuous annealing process. After hot rolling the strip was cold rolled to a final thickness of listed in Table 2. For Examples 1-2 cold rolled strip is made via standard steel making and rolling routes. After cold rolling the material is continuously annealed in standard annealing lines. The relevant data for examples 1 and 2 are presented in Table 3. After heating to a temperature T1, slow cooling (rate 1-10° C./s) to T2 is carried out and subsequently a rapid cooling (rate 20-60° C./s) to temperature T3. Next, the material is galvanized. Examples 3-4 were prepared in a similar manner.

The sheets were also visually examined for the presence of tiger stripes. Tiger stripes were not observed. Surface quality is nearly full-finish. Also a good coatability was achieved.

TABLE 1

Composition examples 1-4

| Example | C | Mn | P | S | Si | N | Al | Nb | B | Ti | V | Cr | Mo | Ni | Σ Cr + Mo + Ni |
|---|---|---|---|---|---|---|---|---|---|---|---|---|---|---|---|
| 1 | 0.103 | 1.788 | 0.010 | 0.004 | 0.020 | 0.0025 | 0.030 | 0.001 | 0.000 | 0.002 | 0.004 | 0.543 | 0.000 | 0.020 | 0.563 |
| 2 | 0.091 | 1.804 | 0.009 | 0.002 | 0.055 | 0.0046 | 0.290 | 0.001 | 0.002 | 0.004 | 0.004 | 0.574 | 0.000 | 0.026 | 0.600 |
| 3 | 0.090 | 1.807 | 0.011 | 0.002 | 0.071 | 0.049 | 0.283 | 0.001 | 0.002 | 0.005 | 0.005 | 0.574 | 0.006 | 0.026 | 0.606 |
| 4 | 0.092 | 1.810 | 0.008 | 0.002 | 0.049 | 0.043 | 0.305 | 0.001 | 0.001 | 0.004 | 0.004 | 0.573 | 0.007 | 0.026 | 0.606 |

TABLE 2

Physical properties examples 1-4

| Example | Thickness | Rp (MPa) | Rm (MPa) | A80 (%) | Au (%) | r | n | Rm*A80 | Rp/Rm |
|---|---|---|---|---|---|---|---|---|---|
| 1 | 1.432 | 390 | 628 | 22.3 | 13.8 | 0.769 | 0.137 | 14015 | 0.62 |
| 2 | 1.377 | 374 | 602 | 25.0 | 16.0 | 0.969 | 0.154 | 15077 | 0.62 |
| 3 | 1.021 | 345 | 645 | 23.0 | 16.0 | 0.912 | 0.159 | 14835 | 0.53 |
| 4 | 0.784 | 336 | 615 | 24.5 | 17.0 | 0.731 | 0.170 | 15068 | 0.55 |

TABLE 3

Annealing data examples 1-2

| Example | T1 (° C.) | T2 (° C.) | T3 (° C.) |
|---|---|---|---|
| 1 | 788 | 678 | 464 |
| 2 | 785 | 680 | 410 |

The invention claimed is:

1. A dual phase or complex phase steel strip having an ultimate tensile strength Rm of at least 600 MPa consisting of, in mass percent, the following elements:
C 0.08-0.11%;
Mn 1.70-1.95%;
Si at most 0.08%;
Cr 0.5-0.6%;
Mo at most 0.3%;
Ni at most 1.0%,
Al 0.01-1.50%;
Nb at most 0.07%;
P equal to or more than 0.005%;
N equal to or less than 0.015%;
Ti equal to or less than 0.1%;
V equal to or less than 0.1%;
B equal to or less than 0.01%;
wherein the sum of Cr, Mo and Ni is at least 0.5%;
the balance being Fe and inevitable impurities.

2. The steel strip according to claim 1, wherein Si is at most 0.071%.

3. The steel strip according to claim 1, wherein
Si is 0.02-0.071%;
Al is 0.01-0.5%.

4. The steel strip according to claim 3, wherein
Cr is 0.50-0.60%;
Mo is at most 0.01%;
Ni is at most 0.05%.

5. The steel strip according to claim 1, wherein
Nb is at most 0.005%,
P is 0.005% to less than 0.05%.

6. The steel strip according to claim 1, wherein Al is at least 0.2%.

7. The steel strip according to claim 1, having a microstructure consisting of:
   martensite 2-50%;
   ferrite 50-98%;
   and pearlite less than 3%.

8. The steel strip according to claim 1, wherein grain size of the steel is about 30 micrometer or less.

9. The steel strip according to claim 1, coated with a coating comprising Zn.

10. The steel strip according to claim 9 being hot dip galvanised.

11. The steel strip according to claim 9, wherein the coating consists of, in mass percent: 0.3-4.0% Mg and 0.05-6.0% Al and at most 0.2% of one or more additional elements selected from the group of Pb, Sb, Ti, Ca, Mn, Sn, La, Ce, Cr, Ni, Zr and Bi, along with unavoidable impurities and the remainder being zinc.

12. The steel strip according to claim 1, comprising 5%-50% martensite.

13. The steel strip according to claim 7, consisting of:
   martensite 5%-50%;
   ferrite 50-98%; and
   pearlite about 0%.

14. A dual phase or complex phase steel strip having an ultimate tensile strength Rm of at least 600 MPa comprising, in mass percent, the following elements:
   C 0.08-0.11%;
   Mn 1.70-1.95%;
   Si at most 0.08%;
   Cr 0.5-0.6%;
   Mo at most 0.3%;
   Ni at most 1.0%,
   Al 0.01-1.50%;
   Nb at most 0.07%;
   P equal to or more than 0.005%;
   N equal to or less than 0.015%;
   Ti equal to or less than 0.1%;
   V equal to or less than 0.1%;
   B equal to or less than 0.01%;
   wherein the sum of Cr, Mo and Ni is at least 0.5%;
   the balance being Fe and inevitable impurities;
   the steel has a microstructure comprising
   martensite 2-50%;
   ferrite 50-98%; and
   pearlite less than 3%.

15. The steel strip according to claim 14, the steel microstructure comprising 5%-50% martensite.

16. The steel strip according to claim 14, the steel microstructure consisting of:
   martensite 5%-50%;
   ferrite 50-98%; and
   pearlite about 0%.

17. The steel strip of claim 14, having an ultimate tensile strength of 600-1000 MPa.

18. The steel strip of claim 1, having an ultimate tensile strength of 600-1000 MPa.

19. The steel strip according to claim 14, wherein Si is at most 0.071%.

20. The steel strip according to claim 14, wherein
   Si is 0.02-0.071%;
   Al is 0.01-0.5%.

21. The steel strip according to claim 20, wherein
   Cr is 0.50-0.60%;
   Mo is at most 0.01%;
   Ni is at most 0.05%.

* * * * *